Nov. 14, 1961    J. STEINGASS    3,008,733
COUPLING ARRANGEMENT FOR SEMI-TRAILERS
Filed June 27, 1960    2 Sheets-Sheet 1

INVENTOR:
Josef STEINGASS

Nov. 14, 1961  J. STEINGASS  3,008,733
COUPLING ARRANGEMENT FOR SEMI-TRAILERS
Filed June 27, 1960  2 Sheets-Sheet 2

INVENTOR:
Josef STEINGASS

United States Patent Office 3,008,733
Patented Nov. 14, 1961

3,008,733
COUPLING ARRANGEMENT FOR
SEMI-TRAILERS
Josef Steinglass, Green Valley 2438, Los Angeles, Calif.
Filed June 27, 1960, Ser. No. 38,784
Claims priority, application Germany June 27, 1959
6 Claims. (Cl. 280—438)

The present invention relates to coupling arrangements for semi-trailers, and more particularly to a pivotal support arrangement for the lower fifth wheel plate of such a coupling arrangement.

In the customary coupling arrangement for connecting a motor tractor to a semi-trailer, a heavy horizontal metal plate, commonly referred to as the upper fifth wheel plate, is mounted on the underside of the forward portion of the trailer frame. A corresponding plate, the lower fifth wheel plate, is mounted on top of the rear portion of the tractor frame. The weight of the trailer is partially transmitted to the wheels of the tractor by the superimposed fifth wheel plates which are secured to each other by means of a vertical king pin which hingedly connects the tractor frame to the trailer frame.

The lower fifth wheel plate is usually mounted on the tractor frame by means of two rocker pins the axes of which are transverse of the direction of tractor movement. In the uncoupled condition of the tractor, the lower fifth wheel plate is inclined in a rearward and downward direction so as to form a slanting ramp which facilitates engagement by the upper fifth wheel plate of the trailer. The fifth wheel has an outwardly flaring radial slot which receives the king pin and guides it into its central position when the trailer is moved into coupling position in front of the trailer.

The rocker pins and the cooperating bearing elements of the conventional fifth wheel arrangement are subject to severe stresses in the normal operation of the tractor. Even when made of especially wear-resistant materials, the rocker pins loosen in their bearings. Frequent replacements of the pin and of the bearing elements which receive it are necessary and the downtime involved in the repair operation has a significant effect on the economics of tractor operation.

An object of this invention is the provision of a rocker arrangement for the lower fifth wheel of a coupling of the type described, which avoids rapid wear.

Another object is the provision of a rocker arrangement in which minor wear of bearing elements is automatically compensated and can be easily and simply adjusted for somewhat more severe wear.

A further object is the provision of a rocker arrangement worn bearing parts of which can be replaced at low cost of material and labor, and with a minimum downtime period of the tractor.

Other objects and many of the attendant advantages of this invention will be readily appreciated as the same becomes better understood by reference to the following detailed description when considered in connection with the accompanying drawing in which like reference numerals designate like or corresponding parts throughout the figures thereof, and wherein.

Figure 1:
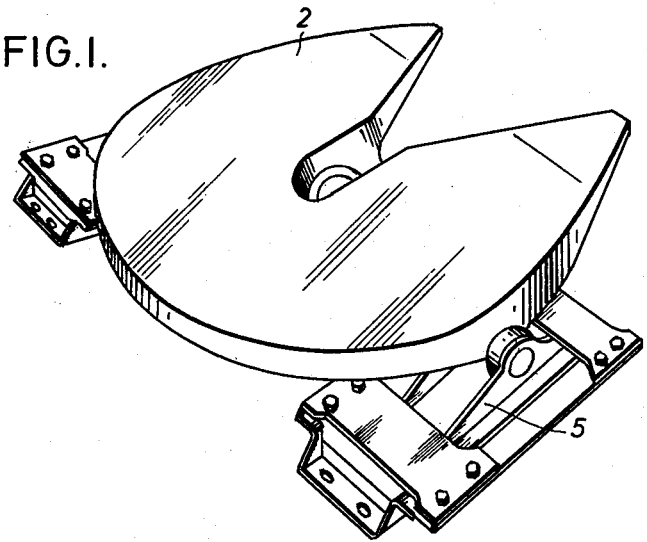
FIG. 1 shows the lower fifth wheel plate and the associated rocker arrangement of a tractor coupling equipped with a preferred embodiment of the invention, in perspective view.

Referring now to the drawing, and initially to FIG. 1, there is shown a basically circular lower fifth wheel plate 2 of substantially conventional shape. The plate 2 is mounted on two bearing brackets 5 for pivotal movement about a substantially horizontal axis which extends transversely of the direction of tractor movement when the fifth wheel is mounted on a tractor frame in the usual manner.

Figure 2:
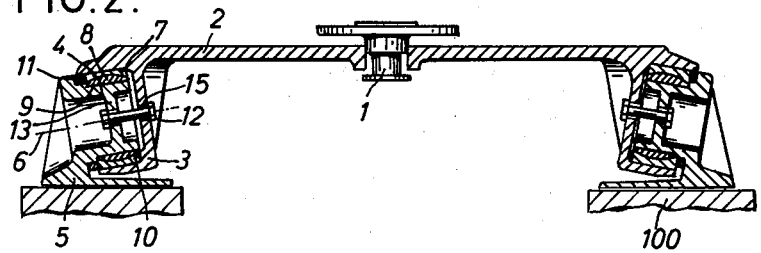
FIG. 2 is a sectional front elevational view of the apparatus of FIG. 1, the section being taken through the vertical axis of the coupling.

FIG. 2 illustrates the apparatus of FIG. 1 in front elevational section through the vertical axis of the coupling, that is, through the king pin 1 which is fixedly fastened to the upper fifth wheel plate (not shown) which cooperates with the plate 2. The lower fifth wheel plate 2 has two integral support brackets 3 which extend downward from the outer ends of the transverse diameter of plate 2. The brackets 3 have approximately cup-shaped recesses and the open sides of the cups face radially outward with respect to king pin 1.

Each of the brackets 3 cooperates with a hollow rocker pin 4 of stepped cylindrical shape which is integral with bearing bracket 5. The bearing brackets 5 are adapted to be mounted on the side rails 100 of the tractor in the usual manner. The mounting may be by rivets or by bolts and nuts for which brackets 5 have suitable openings seen in FIG. 1. The rocker pin 4 and the cup-shaped recess in each cooperating bracket 3 are coaxially arranged. The two common axes 6 are inclined relative to each other in the normal, loaded position of the fifth wheel illustrated in FIG. 2, and each of the axes is inclined at a small acute angle relative to the coupling plane defined by the top surface of lower fifth wheel plate 2. It will be understood that the bearing arrangement is reversible, that is, that the pin member may be mounted on the lower fifth wheel, and the cup member on the tractor frame without departing from the spirit and scope of the invention.

An outer bearing ring 7 is mounted in the cup-shaped recess of bracket 3 and an inner bearing ring 8 is provided on the cylindrical face of rocker pin 4. The rings 7 and 8 are coaxial with respect to axis 6. There cooperating faces are of approximately spherical shape, the bearing face of outer ring 7 being concave and that of inner ring 8 convex. The common center of curvature of the ring faces is located in axis 6. The outer ring 7 has substantially the shape of a bottomless cup and forms a lining or facing on the axial walls of the recess in bracket 3, whereas inner ring 8 is of substantially cylindrical shape and forms a facing on rocker pin 4. Jointly, the rings constitute a ball and socket joint which permits the two coordinated brackets to pivot relatively to each other about axis 6 and also permits limited gyration of the axis within a narrow double cone the axis of which is represented by the position of axis 6 in FIG. 2, and the apex of which is the center of curvature of rings 7, 8.

The inner ring 8 is carried on a cylindrical step 9 of rocker pin 4 which is of reduced diameter. The ring 7 is held in a corresponding machined annular recess 10 the internal axial wall of bracket 3. The outer ring 7 is axially secured by a spacer ring 11 which abuts against a shoulder of bracket 5. The two brackets 3 and 5 are prevented from axially moving apart by a pin 12 which passes through a bore 14 in a radially extending internal face portion 13 of rocker pin 4, and through a bore 15 in bracket 3. A head and a lock nut at the two axial ends of pin 12 hold it in axial position.

The operation of the device described above is inherent in the structure. Pivoting movement of fifth wheel plate 2 during coupling and uncoupling of a trailer from the tractor involves rotation of brackets 3 and 5, and of their bearing rings 7 and 8, relative to each other about axis 6, and a small amount of relative circumferential movement of the two bearing rings relative to each other in a direction transverse of the direction of rotation.

Figure 3:
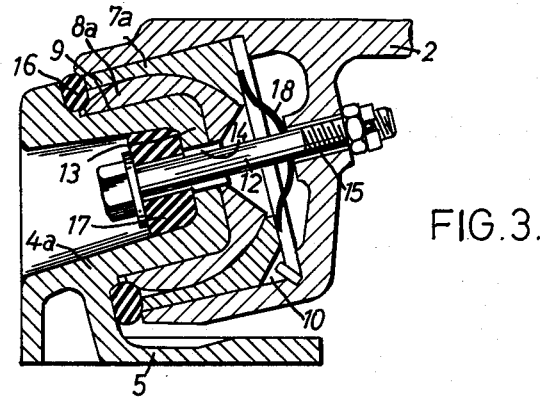
FIG. 3 illustrates another embodiment of the rocker arrangement of the invention in fragmentary front-elevational view corresponding to that of FIG. 2.

A modified version of the device of FIG. 2 is shown in a fragmentary front elevational view in FIG. 3 which is limited to the rocker arrangement proper, it being understood that the apparatus includes two rocker arrangements symmetrically arranged about a king pin in the manner illustrated in FIGS. 1 and 2.

The arrangement shown in FIG. 3 is basically similar to that of FIG. 2. The outer ring 7a is of modified shape. Its inner portion adjacent the bottom of the recess in bracket 3 is of substantially hemispherical shape with an outwardly flaring opening about the axis of the hemisphere. The outer portion of ring 7a is approximately cylindrical and slightly flared towards the outside to facilitate assembly with rocker pin 4a and its bearing ring 8a. The cylindrical and the hemispherical portions of outer ring 7a are coaxial. The outer rim of ring 7a abuts against a packing or spacer ring 16 of resilient material.

The pin 12 is provided with a rubber or like elastomeric buffer 17 which is interposed between the head of pin 12 and radial face portion 13 of rocker pin 4a in the hollow interior of the latter to permit gyration of bolt 12 about the position illustrated in FIG. 3. The bearing rings 7a and 8a are urged into abutment of their cooperating bearing faces by a strong cup spring 18 which is loosely mounted on pin 12 and which abuts against the bottom of the cup-shaped recess in bracket 3.

Figure 4:
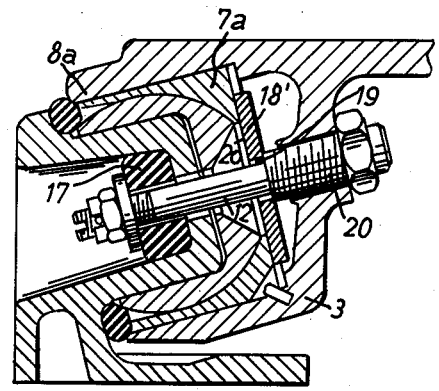
FIG. 4 shows a modification of the device of FIG. 3 in a corresponding view.

In the embodiment of the invention illustrated in FIG. 4 which is similar to that shown in FIG. 3, a rigid pressure plate 18' has been substituted for the spring 18 and the desired resiliency of the pin assembly is provided entirely by the buffer 17. The pin 12' has a shoulder 19 against which plate 18' abuts. Mating threads on shank portion 20 of pin 12' and bracket 3 secure pin 12' in the bracket. Rotation of the pin on its threads permits axial adjustment of rings 7a and 8a relative to each other to take up wear of the bearing faces. Disassembly of the rocker arrangement only requires removal of the pin whereupon the two rings may be axially separated. Wear is practically limited to the rings which can be quickly replaced.

Figure 5:
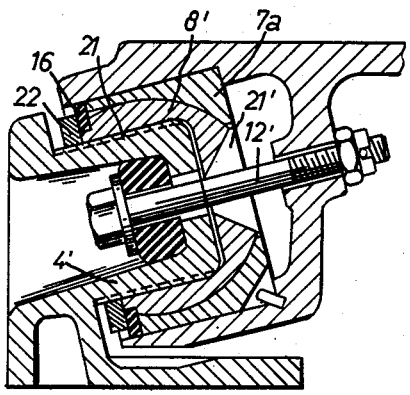
FIG. 5 illustrates yet another embodiment of the invention in a view similar to that of FIG. 3.

In the embodiment of the invention shown in FIG. 5, axial adjustment of the relative position of rings 7a and 8' is achieved by rotating inner ring 8' on threads 21 which attach it to the cylindrical face of rocker pin 4'. The adjusted position of ring 8' is secured by a lock nut 22.

The adjusting means illustrated and described above are adapted to compensate for relatively severe wear whereas minor wear is automatically taken care of by the inclined arrangement of axes 6 and by the resilient elements of the pin assembly. The outwardly flaring openings in the bearing rings shown at 20' in FIG. 4 and 21' in FIG. 5 permit free relative movement of the bearing rings transversely of their axis of rotation, and automatic positioning of the two brackets relative to each other to compensate for wear of the bearing faces which is minimized by the rocking arrangement of the invention.

It should be understood, of course, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What I claim is:

1. In a coupling arrangement for a semi-trailer, in combination, a lower fifth wheel plate defining a coupling plane; two support brackets spacedly mounted on said plate; two bearing brackets adapted to be mounted on a tractor body, said bearing brackets being coordinated with respective ones of said support brackets to form therewith two pairs of coordinated brackets; crowned bearing facings on each of said brackets, the facings of each coordinated pair being matingly engaged for relative rotation about a pivot axis, the pivot axes of said pairs of coordinated brackets being inclined relative to each other, and each pivot axis being inclined relative to said plane at a small acute angle; and fastening means for securing the facings of a coordinated pair of brackets to each other in axially adjustable spatial relationship.

2. In an arrangement as set forth in claim 1, additional fastening means for securing one of said facings to the respective bracket in axially adjustable spatial relationship.

3. In an arrangement as set forth in claim 2, one of said brackets having a threaded portion coaxial with the pivot axis thereof, and said one bracket threadedly engaging said portion.

4. In an arrangement as set forth in claim 1, said fastening means including a resilient member permanently urging said facings of said coordinated pair toward each other.

5. In an arrangement as set forth in claim 4, said resilient member being a spring.

6. In an arrangement as set forth in claim 4, said resilient member being of elastomeric material.

References Cited in the file of this patent

UNITED STATES PATENTS 2,468,013    Kayler    Apr. 19, 1949
2,718,411    Geerds    Sept. 20, 1955